United States Patent

[11] 3,577,643

[72] Inventors Thomas R. Schmidt
Lafayette;
Walter H. Husing, Walnut Creek, Calif.
[21] Appl. No. 639,368
[22] Filed May 18, 1967
[45] Patented May 4, 1971
[73] Assignee Shell Oil Company
New York, N.Y.

[54] BOREHOLE DEFORMATION GAGE
10 Claims, 14 Drawing Figs.

[52] U.S. Cl. .................................................. 33/178
[51] Int. Cl. .................................................. E21b 47/08
[50] Field of Search........................................... 33/178
(A,E,F), 205, 14 (B/6), 147(H)

[56] References Cited
UNITED STATES PATENTS
2,150,070  3/1939  Kregecz......................... 33/178
2,281,960  5/1942  Vacquier....................... 33/178
2,450,839  10/1948 Merritt.......................... 33/143
2,596,024  5/1952  Goble............................ 33/178
2,799,946  7/1957  Mayes........................... 33/178

OTHER REFERENCES
Tooling and Production 1965 Aug. Vol. 31 No.5 " A Practical Laser Interferometer for use in Today's Shop."

Primary Examiner—Leonard Forman
Assistant Examiner—A. J. Mirabito
Attorneys—J. H. McCarthy and Theodore E. Bieber ABSTRACT: Internal stress of earth structure in situ may be determined by drilling a pilot hole and inserting a recording borehole deformation gauge therein. Subsequently, the pilot hole including the recorder is recovered as a core by drilling out an annulus of the earth including the pilot hole. The borehole deformation gauge is an optical interferometer instrument that is continuously monitored at short time intervals photographically.

PATENTED MAY 4 1971

INVENTORS:
THOMAS R. SCHMIDT
WALTER H. HUSING

INVENTORS:
THOMAS R. SCHMDT
WALTER H. HUSING

INVENTORS:
THOMAS R. SCHMIDT
WALTER H. HUSING

PATENTED MAY 4 1971

INVENTORS:
THOMAS R. SCHMIDT
WALTER H. HUSING 3,577,643

BOREHOLE DEFORMATION GAGE

This invention relates to the measurement of internal stress present within the geologic layers of rock comprising the crust of the earth's surface.

More specifically, this invention relates to a method and apparatus for determining the tectonic stresses present in a particular layer of earth strata.

In the art of seismology, there exists a need for a means of determining the degree of in situ mechanical stresses present in a particular geologic strata. Such information may prove useful in determining the manner and extent a mineral-bearing formation may fracture when subjected to one of the known mechanical fracturing methods in use for freeing trapped hydrocarbons around the immediate proximity of a borehole drilled from the surface formation.

Another use for a means for determining tectonic stress in earth formations is to provide a basis for quantitative data leading to the accurate prediction of natural seismic events such as earthquakes.

An objective of this invention, therefore, is to provide a method and apparatus whereby in situ tectonic stresses may be directly and simply determined.

Another object of this invention is to provide a direct mechanical means for measuring borehole wall symmetry and variations thereon in the order of 17 to 30 microinches with an accuracy of approximately 0.2 microinches.

Briefly, the method of this invention comprises the drilling of a pilot hole into the earth formation from which the desired data is to be obtained. Into the pilot hole is inserted an optical interferometer caliper, i.e., a borehole deformation gauge, having short interval photographic monitoring means. The formation section containing the pilot hole and the caliper is then cored symmetrically relative to the pilot hole with a coring drill while the caliper continuously records photographically the shift of interference bands or fringes on the optical flats of the interferometer. By measuring the lateral and annular displacement of such bands, the degree of stress relaxation that has occurred within the test core when isolated from the parent formation may be determined.

The apparatus of this invention comprising the borehole deformation gauge may also be applied to measuring functions independent of tectonic stress determinations. Other uses may include borehole symmetry measurement in tools or other machines where accuracy within millionths of an inch is required. Another use to which the borehole deformation gauge of this invention may be applied is that of a self-mounting strain gauge having no reliance on electrical or electronic sensing equipment.

A detailed description of the method of our invention and the borehole deformation gauge apparatus upon which the method relies as well as further objects of the invention may be obtained from the following description taken with reference to the drawing wherein.

FIGS. 10A—10E schematically illustrate the sequential steps of the invention method.

The fundamental principal upon which the practice of the method of this invention relies is the accurate measurement within 10 microinches per inch of the strain endured by a given sample of the rock formation under analysis. To achieve such accuracy by a measuring instrument located in the bottom of an earth borehole having a three-directional planar capacity of 100 microinches per inch and a sensitivity of 3 microinches per inch an apparatus of the following description has been conceived.

Figure 1:
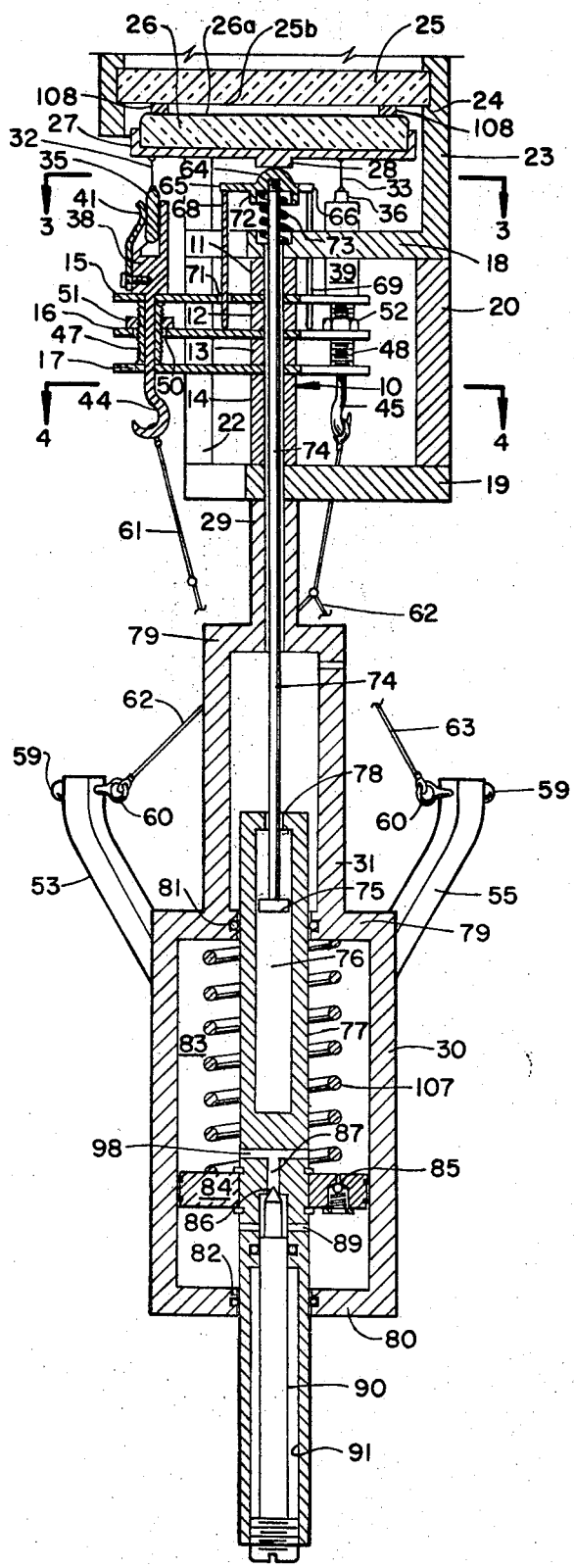
FIG. 1 is a cross-sectional view of the sensor movement and caging section of the borehole deformation gauge apparatus of the invention.
Figure 4:
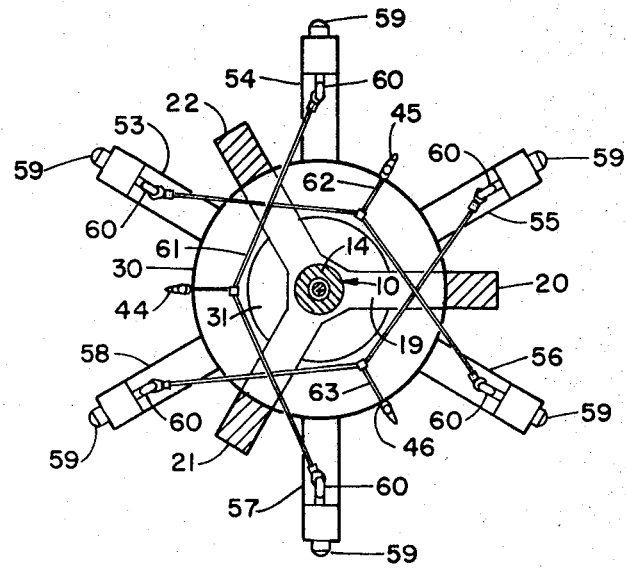
FIG. 4 is a cross section view of the apparatus shown in FIG. 1 taken across cut lines 4–4.
Figure 3:
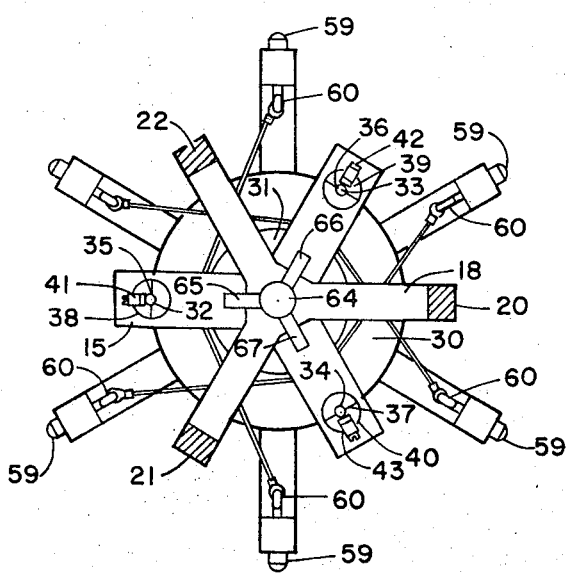
FIG. 3 is a cross-sectional view of the apparatus shown in FIG. 1 taken across cut lines 3–3.

With reference to FIGS. 1, 3 and 4, the borehole deformation gauge of this invention is constructed around a central spine section 10 for rigidity. The spine section 10 comprises a plurality of tubular spacers 11, 12, 13, and 14 which accurately position and secure the three-bladed leaf springs with respect to frame platforms 18 and 19. Frame platforms 18 and 19 are of a three-pointed star configuration and are secured together at the star point ends by spacer columns 20, 21 and 22. Upper frame platform 18 may be an integral end portion to a tubular barrel 23 having a land 24 to securely receive a stationary optical flat 25. The lower frame platform 19 is secured at the center portion thereof to a cylindrical projection 29 from a dashpot cylinder. Rod housing 31, also an integral projection of the dashpot cylinder 30, is disposed between the cylindrical projection 29 and the dashpot cylinder 30 per se.

Moving optical flat 26 is suspended in the bore of tubular barrel 23 between the stationary optical flat 25 and the upper frame platform 18 by thin wire tension members 32, 33, and 34. The upper ends of the wires 32, 33, and 34 are secured to a cup-shaped seat 27 for the optical flat 26. The lower ends of the wires 32, 33 and 34 are secured to short rods 35, 36 and 37. Rods 35, 36 and 37 are slidably disposed in slip joint seats 38, 39 and 40. Slip joint seats 38, 39 and 40 are bored at the upper ends thereof with the outer bore wall cut away so that friction springs 41, 42 and 43 may resiliently bias the rods 35, 36 and 37 against the opposite wall of the slip joint bore. To the lower ends of the slip joint seats 38, 39 and 40 are secured rods having hooks 44, 45 and 46 on the opposite ends thereof. Slip joint seats 38, 39 and 40 are disposed on the outer ends of a three-bladed leaf spring 15 and by virtue of threaded spacer tubes 47, 48 and a third tube respective to slip joint seat 40 not shown on the drawing concentrically disposed around the shank of the hooks 44, 45 and 46 are also supported by a similar three-bladed leaf spring 17. A third three-bladed leaf spring 16 secured to the center spine section 10 between spacers 12 and 13 has apertures such as 50 through the blade ends thereof of sufficient size to freely pass the spacer tubes 47, 48 and 49. To connect the leaf spring 16 to the spacers 47, 48 and 49 unidirectionally, nuts such as 51 and 52 are threaded on said spacers.

In plan, as illustrated in FIGS. 3 and 4, the springs 15, 16 and 17 are angularly arranged to extend radially from the center spine section 10 in the spaces between the star points of frame platforms 18 and 19.

Secured to dashpot cylinder 30 at one end thereof are cantilever springs 53 through 58. Three sets of diametrically opposed springs are provided for example. The diameters between each spring set, 53 and 56, 54 and 57, and 55 and 58, are normal to the radial planes passing through hooks 45, 44 and 46 respectively.

Figure 5:
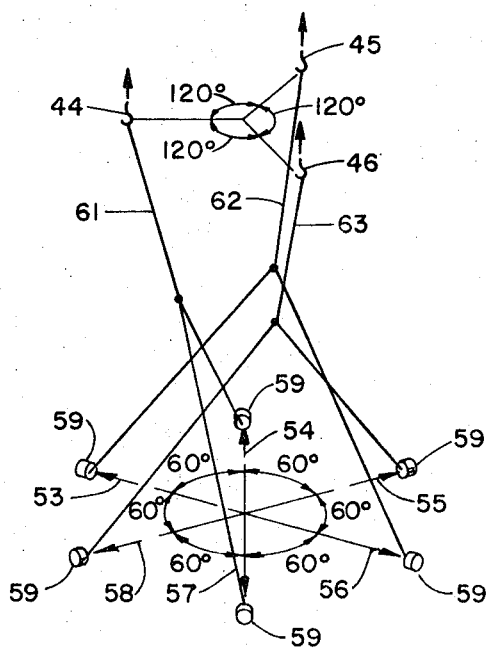
FIG. 5 is a schematic view of the harness linkage interconnecting the dimension sensing fingers of the borehole deformation gauge and the moving optical flat suspension.

Each cantilever spring is provided with radially outwardly extending finger projections 59 and radially inwardly extending eye members 60. Secured between the hooks 44, 45 and 46 and the eyes 60 of respective spring sets are tension cable harness sets 61, 62 and 63 arranged in the manner best illustrated by FIG. 5.

Disposed immediately below the moving optical flat 26 for axial movement into abutted engagement with a raised center abutment section 28 on the flat holder cup 27 is a cap member 64 having three radial projections 65, 66, and 67 in vertical alignment with respective leaf projections of springs 15, 16 and 17. At the ends of each projection 65, 66 and 67 are secured rods 68, 69 and a third rod not shown on the drawing which extend downwardly through apertures 71 and unidirectionally engage respective blades of leaf spring 16. Also disposed on the lower side of cap member 64 is a cup member 72 adapted to receive one end of spring 73. The opposite end of spring 73 is seated on the frame platform 18 to resiliently bias the cap member 64 into abutment with the member 28. An activating rod 74 extends through the hollow center sections of tubular spacers 11, 12 and 13, the internal bore of cylindrical projection 29 and central apertures in the frame platforms 18 and 19 into threaded engagement with cap member 64. The lower end of the activating rod 74 is provided with a radially enlarged portion 75 and extends into a hollow bore 76 in dashpot rod 77. An end abutment portion 78 is provided on the end of dashpot rod 77 receiving the activating rod 74 to engage the enlarged portion 75 thereof unidirectionally. Dashpot rod 77 extends axially through rod apertures in the end walls 79 and 80 of dashpot cylinder 30. Sealing means such as O-rings 81 and 82 are provided around the rod apertures to form a fluidtight chamber 83 within the cylinder 30. Along the dashpot rod 77 at an appropriate position intermediate of the dashpot cylinder end walls 79 and 80 is secured a dashpot piston 84. Check valve means 85 is provided between opposite faces of piston 84 to allow fluid in the chamber 83 to flow from the upper portion of said chamber to the lower portion when the rod and piston are pushed upwardly by an external force. Since the check valve 85 allows fluid flow in one direction only, fluid can only pass from the lower portion of chamber 83 into the upper portion to allow the piston and rod downward movement under the bias of spring 107 by means of an adjustable needle valve 86. Valve 86 regulates the flow of fluid through central passage 87 between radial passages 88 and 89 on opposite sides of piston 84. The aperture opening in valve 86 is adjusted by means of a threaded stem 90 extending coaxially through the bore 91 in the lower end of dashpot rod 77.

Figure 2:
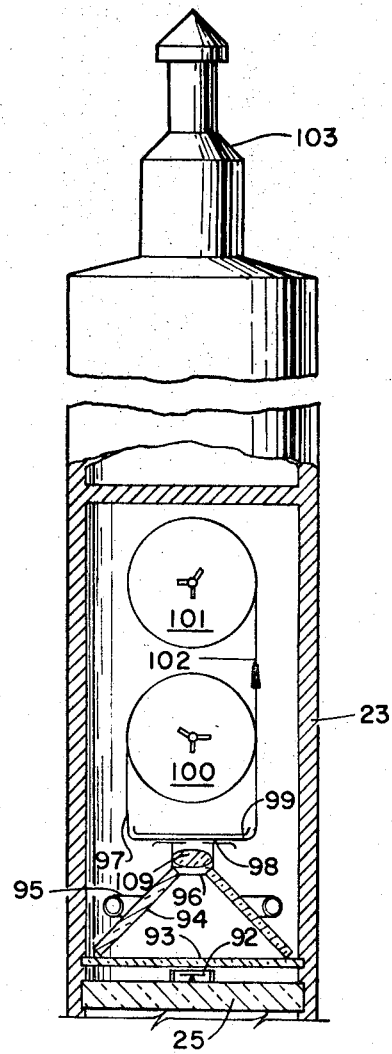
FIG. 2 is a cross section view of the light source and photographic recording section of the borehole deformation gauge apparatus of the invention.

To continuously record interferometer fringe lines appearing on the stationary optical flat for reasons to be explained subsequently, light source and photographic recording means are provided in the tubular barrel 23 as illustrated in FIG. 2.

With respect to said FIG. 2, a magnetic compass 92 is positioned on the upper surface of stationary flat 25. Above the compass 92 a transparent sealing bulkhead 93 is provided across the bore of tubular barrel 23 to seal the portion of said barrel above said bulkhead from the sensing and optical mechanism below. Above the bulkhead 93 is disposed a translucent extended light source 94 which may be a plastic cone having a frosted surface. Around the upper surface of the plastic cone 94 is provided a monochromatic light source such as a mercury discharge lamp ring 95. An aperture 96 is provided in the apex of the plastic cone 94 so that light reflected from the stationary flat may be received through lens 109 and focused on the film strip 97 passing between guide plates 98 and 99. Film strip 97 is automatically advanced from the reel 100 onto the reel 101 in the direction illustrated by the arrow point 102.

Film reels 100 and 101 may be driven by any of means well known in the art adapted to perform such functions but a battery-powered motor driving a gear or belt transmission not shown is cited as an example. The apparatus described herein is a shutterless camera and film exposure times are regulated exclusively by the power source to the lamp 95. For this reason, a timing mechanism is provided to control the lamp illumination period and the frequency and period of film advancement. Like the drive motor and transmission arrangement, timing mechanisms of the type required are well known in the art and are not here illustrated but may be disposed further up in the tubular barrel 23.

At the upper end of the barrel 23 is a cable connector sub 103 by which the deformation gauge may be grasped for lowering into a borehole and released therein as described subsequently.

Figure 6:
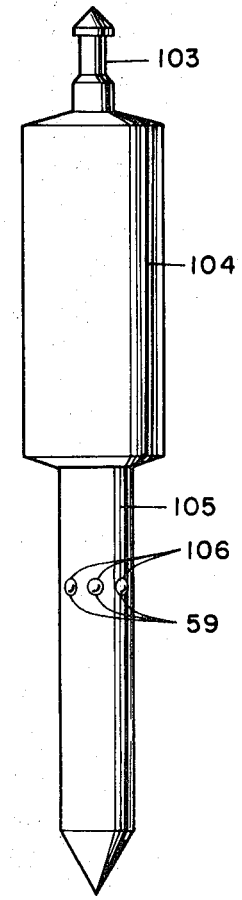
FIG. 6 is a full-face view of the borehole deformation gauge package.

In order to protect the sensitive mechanisms described above and illustrated in FIG. 1, 3 and 4, a protective housing comprising upper and lower portions 104 and 105 as illustrated in FIG. 6 should be provided. So that the dimensional sensing finger projections 59 may engage the wall of the surface to be measured, apertures 106 are provided in the wall of the lower housing portion 105 through which the fingers 59 extend.

In the construction description of the borehole deformation gauge above there is included stationary and moving optical flats 25 and 26. These optical flats are the primary elements of an optical interferometer which functions in the following manner.

Figure 7:
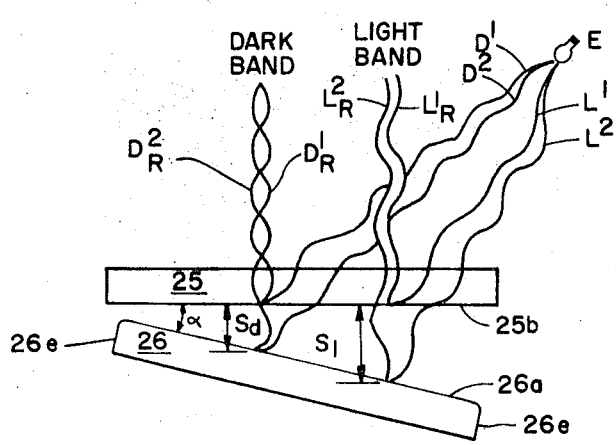
FIG. 7 is a schematic view illustrating the principal of optical interferometer measurement.

Optical flats are normally constructed of fused quartz coated with titanium dioxide for 50 percent reflectance, for example, having a high degree of temperature stability and cast in the shape of a wafer. The planar surfaces of the quartz wafer are the ground parallel and flat to within 0.1 wavelength of light or within approximately 1.7 microinches. One of the planar surfaces is then prepared for approximately 50 percent reflectance. In the present case best illustrated in FIG. 7, the lower surface 25b of the stationary flat and the upper surface 26a of the moving flat are so prepared. When a monochromatic light source E emits waves of known wavelength that are directed against the flats 25 and 26 they are reflected from the surfaces 25b and 26a respectively in such a manner as to augment or diminish the intensity thereof depending on the relative distance between the reflective surfaces. This phenomenon is illustrated in FIG. 7 where the original lightwave emissions $D^1$, $D^2$, $L^1$ and $L^2$ all begin together from the light source E in phase. Wave $L^1$ is partially reflected from surface 25b with the reflected portion $L^1_R$ shown as bouncing vertically up from the point of reflectance. Wave $L^2$ differs from $L^1$ only in the respect that the unreflected portion thereof is shown as passing completely through the stationary flat 25 to be reflected as wave $L^2_R$ from the surface 26a of the moving flat. Since the distance $S_1$ between the respective points of reflectance from surfaces 25b and 26a, as measured parallel with the line of reflected transmission, is approximately the length of one lightwave, 17 microinches for example, or some even multiple thereof, the coinciding reflected waves $L^1_R$ and $L^2_R$ will be received at a point above the surface 25b in phase with each other with their respective intensities cooperating together in an additive manner, the physical result being manifested as a point of light. This result will occur at all points across the viewing plane where the distance between the reflected surfaces 25b and 26a is identical thereby creating a continuous line or band of light.

Figure 8:
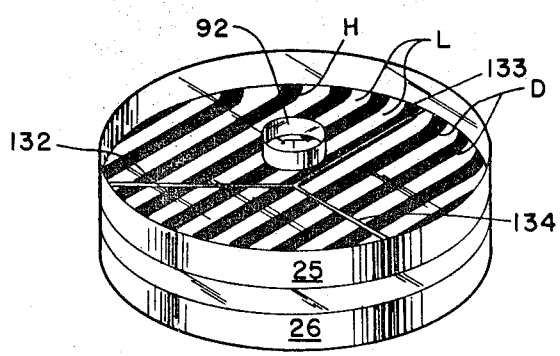
FIG. 8 is a schematic view of the stationary and moving optical flats illustrating fringe lines from a monochromatic light source.

As the light from the source E falls uniformly on the entire surface of flat 25, a different result will occur at those points where the distance between the respective reflecting surfaces is in half wavelength increments. This is demonstrated by lightwave representations $D^1$ and $D^2$ in FIG. 7. Wave $D^1$ is reflected from surface 25b as wave $D^1_R$. Wave $D^2$ is reflected from surface 26a as wave $D^2_R$. The reflecting points on the surfaces 25b and 26a for waves $D^1$ and $D^2$ respectively, having a separation distance $S_d$ equal to a half wavelength, the waves $D^1_R$ and $D^2_R$ come off the respective surfaces 180 phasor degrees out of phase. The physical effect of this result is for the reflective emissions $D^1_R$ and $D^2_R$ to interfere with each other to the extent of cancelling each other out thereby resulting in a light void or dark spot on the viewing plane.

Where the two reflecting surfaces are optically flat but the plane of one has a dip angle to that of the other as exaggeratedly illustrated by the angle $\alpha$ between surfaces 25b and 26a, the result will be series of alternating light and dark bands L and D illustrated in FIG. 8 extending across the plane of the uppermost reflecting surface 25b normal to the dip direction. The spacing between the "fringe" lines D is proportional to the dip angle with a greater spacing appearing as the dip angle approaches 0°. The significance of these fringe lines D and L may be likened unto contour lines on a topographical map where points of equal elevation on the actual surface are represented as a continuous line on the map surface.

It should therefore be seen that by moving the flat 26 toward or away from the flat 25 in a direction normal to the surface 25b, the points between the reflective surfaces 25b and 26a having the spacing $S_d$ and $S_l$ will shift laterally to the right or left of the positions shown. The degree of such shift is directly proportional to the change in the distance between said reflecting surface. In other words, when a dark band appears on surface 25b after the movement of flat 26 at the same position where a light band appeared before the movement, it may be accurately determined the quantity of movement was one-half wavelength of the source light used. For a light source having a wavelength of 17 microinches the distance described would be 8.5 microinches.

Of course, if the flat 26 is moved a distance of exactly one light wavelength with respect to the surface 25b the fringe lines would appear in the same relative positions as before the movement although a particular band, D for example, has shifted to the dark band position next adjacent. Since it is not possible to label any particular fringe line, it is necessary to continuously monitor the viewing plane so that the lateral shift of a particular fringe line can be tracked. It is for this purpose that the camera apparatus of the present invention is provided with means for photographically recording the position of the fringe lines at short intervals of time.

By rounding the edge 26e of the moving flat reflecting surface one is able to discern the point at which the respective flat reflecting surfaces are closest by merely observing the direction in which the hooks H on the respective ends of the fringe lines point. The hooks point in the upslope direction.

The interferometer of the present invention is also provided with radial lines 132, 133 and 134 scribed on the surface 25b which lie in the same radial plane as the thin wire support columns 32, 33 and 34 for the flat 26. By this expedient one is able to determine by the angular shift of the fringe lines relative to the scribed lines 132, 133, and 134 which of the columns 32, 33 or 34 has caused a longitudinal displacement of the flat 26 relative to the surface 25b.

Another orientation device in the present invention is the provision of magnetic compass 92 located in the center of the upper face of flat 25. This expedient is useful in relating fringe line patterns and changes therein to the known direction of the bedding planes of the particular geologic formation under examination.

Figure 9:
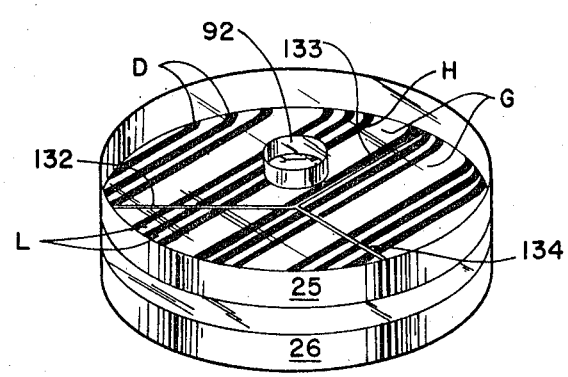
FIG. 9 is a schematic view of the stationary and moving optical flats illustrating fringe lines from a dual wavelength monochromatic light source.

The foregoing explanation of the appearance of fringe lines on an interferometer surface has been premised on the use of a monochromatic light source. As an expedient to simplify tracking of particular fringe lines and to amplify the lateral shifts thereof one may use a dual wavelength monochromatic light source wherein lightwaves of two different wavelengths are propagated. By this means, gaps G as illustrated in FIG. 9 periodically appear in the fringe line sequence thereby providing a more coarse and easily readable pattern.

Figure 10:
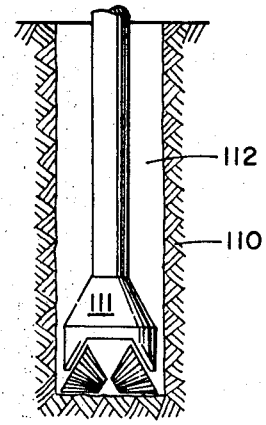
Figure 10:
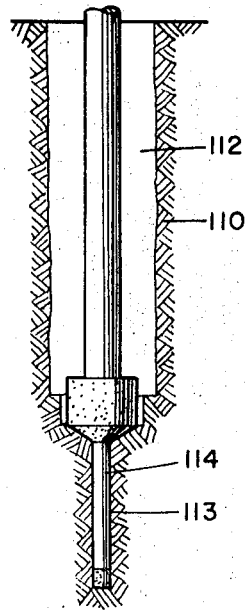
Figure 10:
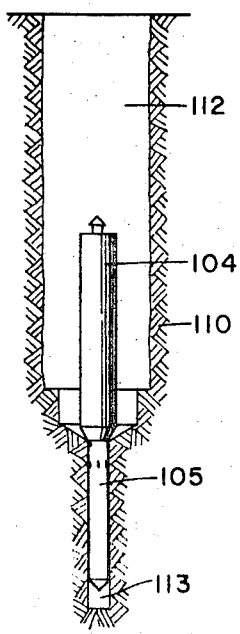
Figure 10:
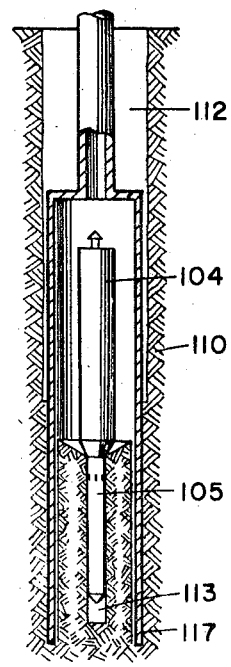
Figure 10:
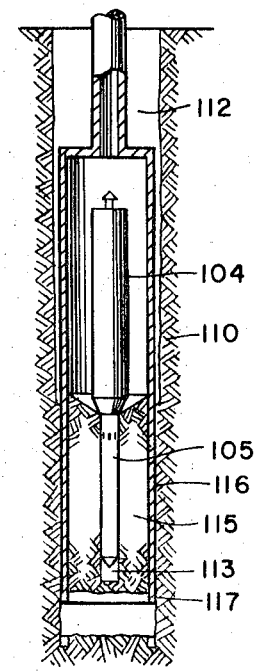

Having now described the construction of the borehole deformation gauge and the details and operation principles of the interferometer therein, attention is now directed to the method of using this device to determine in situ tectonic stress in earth formations. With reference to FIG. 10A, the particular earth formation 110 to be examined is penetrated by a drill bit 111 to form a large borehole 112 therein. FIG. 10B shows the bottom of the borehole 112 to be extended by a pilot hole 113 to a depth at least as great as the length of the lower protective housing section 105 of the deformation gauge. Since the pilot hole 113 must be bored as smoothly and accurately as possible, it should preferably be cut with a diamond-type drill bit 114. The diameter of the pilot hole 113 is most critical and must be within the sensory range of the finger projections 59 as biased by the cantilever springs 53—58. For a sensing finger diameter range of 1.5000 to 1.5625 inches, the pilot hole must have a diameter between 1.5001 and 1.5624 for example. Also, the pilot hole must be substantially smaller than the borehole 112 diameter and a ratio of 6 inches for the borehole 112 diameter to approximately 1.5 inches for the pilot hole 113 diameter is exemplary. Another important factor in drilling the pilot hole 113 is that it be as nearly concentric with the borehole 112 as possible.

The next step in the method of the invention is represented by FIG. 10C showing the lower end 105 of the deformation gauge placed in the pilot hole 113 and released from the cable by means of which it may be lowered to this position.

Before positioning in the pilot hole 113, however, the deformation gauge must be prepared in the following manner. First, the length of the harnesses 61—63 must be adjusted so that all slack therein is removed and the additive forces of the leaf springs 15, 16 and 17 is sufficient to maintain the harnesses in tension throughout the operative expansion range of the cantilever spring ends 53—58 and the finger projections 59 attached thereto. Furthermore, the tensile forces exerted by the springs 15 and 17 should be delicately balanced so that when the bias exerted by the spring 16 is removed by the engagement of the rods 68—70 therewith which causes the leaf ends of springs 16 to be moved downwardly thereby disengaging the nuts 51, there will be a slight downward movement of the slip joint seats 38 relative to the short rods 35—37.

Next, the needle valve 86 is adjusted to determine the time elapse required between the moment of setting and the desired moment when the moving flat 26 is to be released from its caged position.

The piston rod 77 and piston 84 is then manually pushed to the uppermost position against the dashpot spring 107 thereby lifting the abutment 78 out of engagement with the radially enlarged portion of the actuating rod 74. With the rod 74 freed for movement in the upward direction, spring 73 expands to push the cap member 64 against the abutment 28 to cage the moving flat 26 in the uppermost position. The upward movement of the cap member 64 also disengages the rods 68—70 from the leaves of spring 16 thereby adding the upward biasing force of spring 16 on the slip joint seats 38—40 to that of the springs 15 and 17.

With the moving flat 26 firmly caged against the pads 108 on the lower surface of stationary flat 25, said pads 108 being approximately 100 microinches in thickness, the deformation gauge is placed in position in the pilot hole 113. Since the cantilever springs 53—58 are for the purpose of maintaining the sensory fingers 59 in intimate contact with the surface to be measured, i.e. the wall of the pilot hole 113, some accommodation must be made to allow them to move independently of the moving flat 26 while being placed into position. This function is served by the slip joints 38—40 which have only sliding contact with the rods 35—37 that are secured to the flat 26. When the gauge is inserted in the pilot hole 113 the fingers 59 are pressed inwardly against the springs 53—58 by the walls of the pilot hole. At the same time, the springs 15—17 maintain the tension on the harnesses 61—63 by urging the hooks 44—46 upwardly. This upward motion is also sustained by the slip joint seats 38—40 but because of only sliding contact, no vertical motion is transmitted to the rods 35—37 and wire columns 32—34. In this manner the linkage between the sensory fingers 59 and the flat 26 accommodates and adjusts itself to the coarse dimensions of the borehole.

After the appropriate time has expired to allow the piston 84 to be pushed down in the dashpot chamber 83 by the spring 107 thereby causing abutment 78 to engage the enlarged end 75 of the activating rod 74, the rod 74 pulls the cap member 64 away from the moving flat abutment 28 and disengages the leaf end of spring 16 from the nuts 51—53. With the biasing force of the spring 16 removed, the tension in the harnesses 61—63 is greater than the biasing forces of leaf springs 15 and 17. Equalization of the opposing forces occurs when the hooks and hence, the moving flat 26, are pulled down to further stress the springs 15 and 17 and relax the tension in the harnesses 61—63. At this juncture it is to be explained that the friction springs 41—43 press the rods 35—37 into contact with the seating surface of slip joint seats 38—40 with only enough force as to support the uncaged weight of the flat 28 and its attachments but with not so much force as to prohibit relative sliding between the rods 35—37 and the seats 38—40 when the flat 26 is caged.

The deformation gauge is now activated and responsive to any minute variation that may subsequently occur in the pilot hole 113. Any variations in the pilot hole diameter will be followed by the sensory fingers 59 to cause a pulling or relaxing on the leaf springs 15 and 17 via the harnesses 61—63. Such motion is then transmitted through the slip joints 38—40 to the flat 26 to produce a tilting of the flat 26, a movement of the flat 26 normal to the surface of the flat 25 or a combination of these movements. Since, as a matter of practicality, it is impossible to achieve an absolute parallelism between the surfaces 25b and 26a, fringe lines will appear on surface 25b when the lamp 95 is energized. Dimensional variations between any particular set of diametrically opposite sensory fingers 59 will then cause a proportional and identifiable shift in the resulting fringe pattern. Such shifts are then recorded at appropriate intervals on the periodically advancing film strip 97 where they can later be analyzed and evaluated.

In order to release the in situ tectonic stresses in the particular formation section chosen for examination so that the resulting strain relaxation therein may by measured by the deformation gauge, the sample of rock containing the pilot hole and deformation gauge is overcored by a core bit 117 as shown in FIG. 10D. This bit also is preferably of the diamond type which cuts smoothly and practically vibrationlessly, a necessity in view of the fact that the deformation gauge is recording continuously during the core-cutting process.

Having separated the chosen rock sample from the surrounding formation by an annular space cut by the core bit 117, the core sample 115 is held in the core barrel 116 and broken from the formation at its bottom to be withdrawn from the borehole 112 to the surface as illustrated by FIG. 10E for stress/strain property analysis.

Knowing the stress/strain properties, the exact dimensions both before and after severance from the mother formation and the orientation of the bedding planes of the sample one is able to determine the exact amount of tectonic stress sustained by the formation 110.

Although the aforedescribed method and apparatus has been directed to the specific design and construction of a borehole deformation gauge and its use in determining in situ tectonic stresses in rock formations, it should be understood that the apparatus described may, with variations obvious to those having skill in the art, be applied to other measuring uses. For example, a simplified mechanism using only two sensory fingers acting on a single support column for the moving flat may be used as an ultrasensitive micrometer. With appropriate motion-transmitting linkages, the described apparatus may be used as a mechanical strain gauge free from electronic amplifiers. Furthermore, other mechanical devices may be substituted for particular devices described such as links and levers in place of the harnesses 61—63. Also, other recording devices may be substituted for the camera means disclosed such as a photocell coupled to a digital counter for counting fringes as they move past a given point on the viewing plane.

Since mechanical and electrical arrangements and devices may be employed other than those specifically described herein to accomplish the intents and purposes of this invention, no limitation is intended thereby except those specifically and distinctly described in the following claims.

We claim:

1. A method of measuring dimensional variations of a borehole comprising the following steps:
   spanning a dimension of said borehole with resiliently biased movable finger elements;
   mechanically linking the spread of said finger elements to a movable optical flat;
   directing light waves from a substantially monochromatic source through a stationary optical flat having a partially reflective surface and against a partially reflective surface of said moving flat;
   moving said partially reflective surface of said movable flat with respect to the partially reflective surface of said stationary flat a distance proportional to a dimension variation sensed by a change in the spread of said finger elements; and
   noting the number of spaces a particular fringe line seen above said stationary optical flat laterally shifts in response to said dimensional variation to determine the relative quantity of said dimensional variation.

2. Apparatus for measuring dimensional variations between oppositely facing surfaces, said apparatus comprising:
   resiliently biased finger means for bearing respectively against said oppositely facing surfaces;
   stationary optical flat means having a partially light-reflective surface;
   movable optical flat means having a partially light-reflective surface disposed adjacent to and substantially parallel with said stationary flat means, said movable flat means having freedom of movement with respect to the light-reflective surface of said stationary flat means;
   light source means of substantially monochromatic wavelength propagation for emitting light waves to pass through said moving and stationary flat means, at least a portion of said light waves reflecting from each of said partially reflecting surfaces to form fringe lines; and
   linkage means interconnecting said finger elements and said movable flat means whereby dimensional variations between said oppositely facing surfaces which cause a change in the span between said finger elements are transmitted to said movable flat means to change the spacing between said light-reflective surfaces proportionately, thereby causing a relative lateral shift of respective fringe lines.

3. Apparatus as described by claim 2 wherein the edge of the surface of said moving optical flat nearest to said stationary optical flat is slightly turned, thereby causing said fringes to appear, as viewed through said stationary flat, with ends turned in the direction of greatest proximity between said flats.

4. Apparatus as described in claim 2 having caging means to securely position said moving flat until said finger means are properly positioned between said oppositely facing surfaces, and slip joint means in said linkage means to allow said finger means movement independent of said moving flat means while said caging means is engaged.

5. Apparatus as described by claim 4 having timing means to disengage said caging means after the elapse of a predetermined period of time.

6. Apparatus as described by claim 5 wherein said timing means is spring-biased dashpot means having variable orifice means.

7. Apparatus as described by claim 4 having slip joint biasing means between said caging means and said linkage means to urge said moving flat means away from said caged position when said caging means disengages said moving flat means.

8. Apparatus as described by claim 2 having light source means of more than one wavelength.

9. Apparatus as described by claim 2 having recording means integral therewith for recording the position of a particular fringe line at some particular instant of time.

10. Apparatus as described by claim 9 wherein said recording means is photographic means having means for periodic film advance.